United States Patent [19]

Stewart

[11] Patent Number: 4,927,910

[45] Date of Patent: May 22, 1990

[54] PREPARATION OF LINEAR POLYCARBONATES FROM CYCLIC OLIGOMER COMPOSITIONS USING ARYL TETRAHYDROPYRANYL ETHER CATALYST

[75] Inventor: Kevin R. Stewart, Schenectady, N.Y.

[73] Assignee: General Electric Company, Schenectady, N.Y.

[21] Appl. No.: 313,564

[22] Filed: Feb. 22, 1989

[51] Int. Cl.$^5$ .............................................. C08G 63/62
[52] U.S. Cl. ................................... 528/371; 528/198; 528/199; 528/370
[58] Field of Search ................ 528/371, 370, 198, 199

[56] References Cited

U.S. PATENT DOCUMENTS 4,224,429  9/1980  Lehn et al. ........................... 528/371

Primary Examiner—Harold D. Anderson
Attorney, Agent, or Firm—William H. Pittman; James C. Davis, Jr.

[57] ABSTRACT

Cyclic polycarbonate oligomers are converted to linear polycarbonates by the catalytic action of an aryl tetrahydropyranyl ether. The polymerization reaction is slow, and therefore particularly useful in such operations as resin transfer molding.

16 Claims, No Drawings

PREPARATION OF LINEAR POLYCARBONATES FROM CYCLIC OLIGOMER COMPOSITIONS USING ARYL TETRAHYDROPYRANYL ETHER CATALYST

This invention relates to the preparation of linear polycarbonates and similar condensation polymers, and more particularly to a method for their preparation from cyclic oligomer compositions.

The conversion of low molecular weight cyclic aromatic carbonate polymers to linear polycarbonates is known. Reference is made, for example, to the following U.S. patents:

| | |
|---|---|
| 3,155,683 | 3,386,954 |
| 3,274,214 | 3,422,119. |

More recently, cyclic polycarbonate oligomer mixtures have been prepared and converted to linear polycarbonates, often of very high molecular weight, by contact with a wide variety of polycarbonate formation catalysts. Reference is made, for example, to U.S. Pat. Nos. 4,644,053 and 4,740,583, the disclosures of which are incorporated by reference herein.

Many of the catalysts used to convert cyclic polycarbonates to linear polymers have relatively rapid action. This is, of course, often desirable, since there is frequently nothing gained by prolonging the polymerization reaction. However, under certain circumstances a much slower rate is desired.

An example of such a circumstance is the resin transfer molding process. It involves transfer of the material to be polymerized from a heated vessel into a mold which contains a reinforcing material, typically a fiber mat. In order to facilitate transfer and thorough wetting of the mat, the material must be maintained liquid and at a relatively low viscosity, which requires high temperatures. It is highly desirable for polymerization to proceed very slowly so that transfer and fiber wetting are optimized.

A property of many of the previously known catalysts used for this purpose is the presence therein of ionic species. The identity of such species is evident for catalysts such as sodium tetraphenylborate, tetrabutylammonium tetraphenylborate and lithium phenoxide. The cations in such catalysts may impair the hydrolytic stability of the polycarbonate at high temperatures. It is of interest, therefore, to provide a class of catalysts which contain no long-lived cationic moieties.

The present invention provides a method for polymerizing cyclic polycarbonates which employs a very slow catalyst, facilitating resin transfer molding and similar operations. Said method employs essentially no cationic materials, and thus improves the hydrolytic stability of the product polycarbonates. The invention also provides polymerizable compositions having the same advantages.

In one of its aspects, therefore, the invention includes a method for preparing a resinous composition which comprises contacting, at a temperature in the range of about 200°–350° C., at least one cyclic polycarbonate oligomer with a catalytic amount of at least one aryl tetrahydropyranyl ether.

The cyclic polycarbonate oligomer compositions useful in the method of this invention generally comprise a plurality of structural units of the formula

at least about 60% of the total number of R values are divalent aromatic organic radicals, the balance thereof being aliphatic, alicyclic or aromatic organic radicals. Such compositions include dimers, trimers and tetramers, as well as cyclic polycarbonate oligomer mixtures.

The R values may be different but are usually the same, and may be aliphatic, alicyclic, aromatic or mixed; those which are aliphatic or alicyclic generally contain up to about 8 carbon atoms. Suitable R values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all R radicals are hydrocarbon radicals.

Preferably at least about 80% of the total number of R values in the cyclic oligomer mixtures, and most desirable all of said R values, are aromatic. The aromatic R radicals preferably have the formula

wherein each of $A^1$ and $A^2$ is a monocyclic divalent aromatic radical and Y is a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula II is the 2,2-bis(4-phenylene)propane radical, which is derived from bisphenol A and in which Y is isopropylidene and $A^1$ and $A^2$ are each p-phenylene.

The cyclic oligomer mixtures consist essentially of oligomers having degrees of polymerization from 2 to about 30 and preferably to about 20, with a major proportion being up to about 12 and a still larger proportion up to about 15. Since they are mixtures of oligomers having varying degrees of polymerization, these compositions have relatively low melting points as compared to single compounds such as the corresponding cyclic trimer. The cyclic oligomer mixtures are generally liquid at temperatures above 300° C. and most often at temperatures above 225° C.

The cyclic oligomer mixtures contain very low proportions of linear oligomers. In general, no more than about of such linear oligomers, if any, are present.

The mixtures also usually contain low percentages, if any, of polymers (linear or cyclic) having a degree of polymerization greater than about 30. For the purposes of this invention, which often require relatively very low viscosities at the temperatures at which the oligomers are liquid, it is usually preferred and sometimes essential for the proportion of such polymers having a high degree of polymerization to be low, generally no higher than about 5%. Removal of such polymers, when necessary, is easily achieved by precipitation with a non-solvent, as disclosed, for example, in the aforementioned U.S. Pat. No. 4,644,053.

According to the present invention, conversion of the cyclic polycarbonates to linear polycarbonates is effected by contact with at least one aryl tetrahydropyranyl ether. Said ethers may be represented by the formula

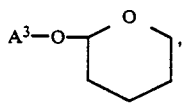
(III)

wherein $A^3$ is an aromatic hydrocarbon radical or a substituted aromatic radical in which the substituents are no more strongly electron-donating than an alkyl radical. Thus, $A^3$ may be unsubstituted or substituted phenyl, 1-naphthyl, 2-naphthyl or the like; phenyl radicals are preferred.

Any substituents on the aromatic radical should be electron-withdrawing or, at least, no more electron-donating than an alkyl group. Thus, suitable substituents include alkyl, aralkyl, halo, nitro and acyl. It is also contemplated to employ compounds containing two tetrahydropyranyl ether moieties, an example being bisphenol A bis(tetrahydropyranyl ether).

The polymerization reaction is typically conducted by merely contacting the cyclic oligomer mixture with the catalyst at a temperature in the range of about 200°–350° C., preferably about 200°–300° C., until polymerization has proceeded to the extent desired. Although a solvent may be used, it is not necessary and is frequently not preferred. It is within the scope of the invention to conduct the polymerization in a mold to produce a molded article, or in an extruder to produce a linear polycarbonate as the extrudate.

Under these polymerization conditions, it is believed that the tetrahydropyranyl ether dissociates into an aryloxide anion and a tetrahydropyranyl cation. The anion is the actual catalytic species, opening the cyclic polycarbonate ring by nucleophilic attack and generating a "living" linear polymer anion. Said "living" anion then reacts with the tetrahydropyranyl cation to produce a capped polycarbonate. This latter species may be formed at any stage of the polymerization process, and is capable of becoming "uncapped" and undergoing further reaction until high molecular weight is attained. It is further believed that this capping-uncapping sequence is one reason for the slowness of the polymerization reaction according to the invention.

Compositions comprising cyclic oligomers which comprise units of formula I and at least one aryl tetrahydropyranyl ether may be prepared by dissolving the cyclic compositions in a suitable solvent, preferably methylene chloride to which said ether is added in the desired proportions. The solvent is then evaporated to reduce an intimate blend of said ether with the cyclic composition. Such blend is stable at ambient temperatures but may be slowly polymerized by heating to an appropriate temperature. Polymerizable compositions of this type are another aspect of the invention.

The proportion of catalyst used in the method of this invention will depend to some extent on the molecular weight of the polymer desired and the time available for completion of the polymerization reaction. Since a "living" polymerization is involved, the molecular weight of the polymer will vary inversely with the proportion of catalyst used. On the other hand, the reaction rate varies directly with the proportion of catalyst. Therefore, as said proportion is increased, the time required for polymerization and the molecular weight of the product both decrease. Balancing these factors, it is generally found that catalyst proportions of about 0.001–0.5 mole percent, based on structural units in the oligomer, are satisfactory.

The invention is illustrated by the following examples. The cyclic polycarbonate composition used in each example was a mixture of bisphenol A cyclic polycarbonate oligomers, principally having degrees of polymerization from 2 to about 6 and substantially free from linear polycarbonate; molar proportions thereof are in terms of carbonate units. Molecular weights were determined by gel permeation chromatography relative to polystyrene.

EXAMPLES 1–2

A series of polymerization experiments was run at 280° C. in a reaction vessel fitted with a stirrer maintained at a constant speed of 100 rpm., by means of a motor which compensated for increasing viscosity by proportionally and measurably increasing the current. By means of a computer, plots were made of viscosity (as determined from current input) against time and the slopes of the resulting curves at the points of maximum rate of change of viscosity were determined. These slopes were in turn converted to relative polymerization rates, using lithium phenoxide as a standard having a value of 1.00. Since the viscosities at the points of maximum rate of change corresponded to a polymer level of only about 35–40% high molecular weight material, only the early part of each reaction was considered in this portion of the experiment.

In each example, a 50-gram portion of cyclic polycarbonate oligomers was heated and stirred for a period of time sufficient to establish that no polymerization was taking place. A sample of aryl tetrahydropyranyl ether in the amount of 0.1 mole percent was then added and stirring was continued as the viscosity data were taken and until the reaction was complete. The weight and number average molecular weights of the resulting linear polycarbonates were then determined. The results are given in the following table.

| Example | Catalyst | Relative rate | Mw | Mn | Mw/Mn |
|---|---|---|---|---|---|
| 1 | 4-Nitrophenyl tetrahydropyranyl ether | 0.03 | 15,600 | 10,600 | 1.5 |
| 2 | Bisphenol A bis(tetrahydropyranyl ether) | 0.01 | 24,100 | 15,300 | 1.6 |

What is claimed is:

1. A method for preparing a resinous composition which comprises contacting, at a temperature in the range of about 200°–350° C., at least one cyclic polycarbonate oligomer with a catalytic amount of at least one aryl tetrahydropyranyl ether.

2. A method according to claim 1 wherein the aryl tetrahydropyranyl ether has the formula

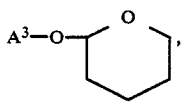 (III)

wherein $A^3$ is an aromatic hydrocarbon radical or a substituted aromatic radical in which the substituents are no more strongly electron-donating than an alkyl radical.

3. A method according to claim 1 wherein the cyclic polycarbonates comprise a plurality of structural units of the formula

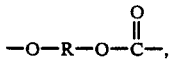 (I)

wherein at least about 60% of the total number of R values are divalent aromatic organic radicals, the balance thereof being aliphatic, alicyclic or aromatic organic radicals.

4. A method according to claim 3 wherein each R radical has the formula

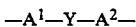 (II)

wherein each of $A^1$ and $A^2$ is a monocyclic divalent aromatic radical and Y is a bridging radical in which one or two atoms separate $A^1$ from $A^2$.

5. A method according to claim 4 wherein the aryl tetrahydropyranyl ether is present in the amount of about 0.001–0.5 mole percent, based on structural units in the oligomer composition.

6. A method according to claim 5 wherein $A^1$ and $A^2$ are each p-phenylene and Y is isopropylidene.

7. A method according to claim 6 wherein the aryl tetrahydropyranyl ether is phenyl tetrahydropyranyl ether.

8. A method according to claim 6 wherein the aryl tetrahydropyranyl ether is 4-nitrophenyl tetrahydropyranyl ether.

9. A method according to claim 6 wherein the aryl tetrahydropyranyl ether is bisphenol A bis(tetrahydropyranyl ether).

10. A polymerizable composition comprising cyclic polycarbonate oligomers comprising structural units of the formula

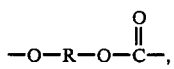 (I)

wherein at least about 60% of the total number of R values are divalent aromatic organic radicals, the balance thereof being aliphatic, alicyclic or aromatic organic radicals; and at least one aryl tetrahydropyranyl ether.

11. A composition according to claim 10 wherein each R radical has the formula

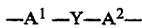 (II)

wherein each of $A^1$ and $A^2$ is a monocyclic divalent aromatic radical and Y is a bridging radical in which one or two atoms separate $A^1$ from $A^2$.

12. A composition according to claim 11 wherein the aryl tetrahydropyranyl ether is present in the amount of about 0.001–0.5 mole percent, based on structural units in the oligomer composition.

13. A composition according to claim 12 wherein $A^1$ and $A^3$ are each p-phenylene and Y is isopropylidene.

14. A composition according to claim 13 wherein the aryl tetrahydropyranyl ether is phenyl tetrahydropyranyl ether.

15. A composition according to claim 13 wherein the aryl tetrahydropyranyl ether is 4-nitrophenyl tetrahydropyranyl ether.

16. A composition according to claim 13 wherein the aryl tetrahydropyranyl ether is bisphenol A bis(tetrahydropyranyl ether).

* * * * *